(12) United States Patent
Bhattacharya et al.

(10) Patent No.: US 10,198,481 B2
(45) Date of Patent: Feb. 5, 2019

(54) MULTIPLE CRITERIA DECISION ANALYSIS IN DISTRIBUTED DATABASES

(71) Applicant: INDIAN INSTITUTE OF TECHNOLOGY KANPUR, Kanpur (IN)

(72) Inventors: Arnab Bhattacharya, Kanpur (IN); Shashwat Mishra, Deoria (IN)

(73) Assignee: INDIAN INSTITUTE OF TECHNOLOGY KANPUR, Kanpur, Uttar Pradesh (IN)

(*) Notice: Subject to any disclaimer, the term of this patent is extended or adjusted under 35 U.S.C. 154(b) by 465 days.

(21) Appl. No.: 14/770,095

(22) PCT Filed: Feb. 19, 2014

(86) PCT No.: PCT/IB2014/059087
§ 371 (c)(1),
(2) Date: Aug. 25, 2015

(87) PCT Pub. No.: WO2015/104591
PCT Pub. Date: Jul. 16, 2015

(65) Prior Publication Data
US 2016/0004702 A1    Jan. 7, 2016

(30) Foreign Application Priority Data

Jan. 7, 2014 (IN) .............................. 50/DEL/2014

(51) Int. Cl.
*G06F 7/00* (2006.01)
*G06F 17/30* (2006.01)
*G06F 17/18* (2006.01)
(52) U.S. Cl.
CPC .......... *G06F 17/3053* (2013.01); *G06F 17/18* (2013.01); *G06F 17/30557* (2013.01); *G06F 17/30864* (2013.01)

(58) Field of Classification Search
USPC ........................................................ 707/748
See application file for complete search history.

(56) References Cited

U.S. PATENT DOCUMENTS

| 7,299,220 | B2 | 11/2007 | Chaudhuri et al. |
| 7,908,264 | B2 | 3/2011 | Bohannon et al. |

(Continued)

FOREIGN PATENT DOCUMENTS

| CN | 101895547 A | 11/2010 |
| CN | 102254016 A | 11/2011 |

(Continued)

OTHER PUBLICATIONS

Atallah, M.J., and Qi, Y., "Computing All Skyline Probabilities for Uncertain Data," Proceedings of the twenty-eighth ACM SIGMOD-SIGACT-SIGART symposium on Principles of database systems, pp. 279-287 (Jun. 29, 2009).

(Continued)

*Primary Examiner* — James Trujillo
*Assistant Examiner* — John J Morris

(57) ABSTRACT

Embodiments of the present disclosure set forth methods for selecting a preferred data set from distributed databases including a first database having a first probability attribute and a second database having a second probability attribute. One example method may include receiving a first data set from the first database and a second data set from the second database. The first data set includes a first monotonic attribute. The second data set includes a second monotonic attribute. It may further include selecting a candidate data set from one of the first data set and the second data set based on a comparison of the first monotonic attribute and the second monotonic attribute and determining whether the selected candidate data set is the preferred data set.

41 Claims, 5 Drawing Sheets

(56) References Cited

U.S. PATENT DOCUMENTS

| | | | |
|---|---|---|---|
| 8,468,174 B1 | 6/2013 | Yueh et al. | |
| 8,504,581 B2* | 8/2013 | Bhattacharya | G06F 17/30442 707/758 |
| 2007/0198439 A1 | 8/2007 | Shriraghav et al. | |
| 2008/0052269 A1 | 2/2008 | Abdo et al. | |
| 2008/0147587 A1 | 6/2008 | Yokoyama | |
| 2008/0168015 A1 | 7/2008 | Thie et al. | |
| 2008/0195643 A1* | 8/2008 | Sheth-Voss | G06F 17/3056 |
| 2008/0294648 A1 | 11/2008 | Lin et al. | |
| 2013/0103371 A1 | 4/2013 | Yi et al. | |

FOREIGN PATENT DOCUMENTS

| | | |
|---|---|---|
| CN | 102323957 A | 1/2012 |
| CN | 103150326 A | 6/2013 |
| CN | 103150327 A | 6/2013 |
| CN | 103150336 A | 6/2013 |
| CN | 103308314 A | 9/2013 |

OTHER PUBLICATIONS

Bartolini, I., et al., "Salsa: Computing the Skyline without Scanning the Whole Sky", Proceedings of the 15th ACM international conference on Information and knowledge management, pp. 405-414 (Nov. 6-11, 2006).

Bhattacharya, A., and Teja, B. P., "Aggregate Skyline Join Queries: Skylines with Aggregate Operations over Multiple Relations," International Conference on Management of Data COMAD 2010, pp. 1-12 (Dec. 8-10, 2010).

Bohm, C., et al., "Skyline Operators for Existentially Uncertain Data," The 1st International Workshop on Querying and Mining Uncertain Spatio-Temporal Data, pp. 1-8 (Nov. 3, 2009).

Borzsonyi, S., et al., "The Skyline Operator," Proceedings of the 17th International Conference on Data Engineering, pp. 421-430 (Apr. 2, 2001).

Chaudhuri, S., et al., "Robust Cardinality and Cost Estimation for Skyline Operator," Proceedings of the 22nd International Conference on Data Engineering, pp. 1-10 (Apr. 3-7, 2006).

Chomicki, J., et al., "Skyline with Presorting", Proceedings 19th International Conference on Data Engineering, pp. 717-719 (Mar. 5-8, 2003).

Dar, S., and Agrawal, R., "Extending SQL with Generalized Transitive Closure," IEEE Transactions on Knowledge and Data Engineering, vol. 5, No. 5, pp. 799-812 (Oct. 1993).

Dimitris Papadias et al., "An Optimal and Progressive Algorithm for Skyline Queries", In ACM SIGMOD, pp. 167-478 (Jun. 9-12, 2003).

Fagin, R., et al., "Optimal Aggregation Algorithms for Middleware", Proceedings of the twentieth ACM SIGMOD-SIGACT-SIGART symposium on Principles of database systems, pp. 102-113 (May 1, 2001).

Godfrey, P., et al., "Maximal Vector Computation in Large Data Sets", Proceeding of the 31st international conference on Very large data bases, pp. 229-240 (Aug. 30, 2005).

Goldstein, J., et al., "Processing Queries by Linear Constraints," Proceedings of the sixteenth ACM SIGACT-SIGMOD-SIGART symposium on Principles of database systems, pp. 257-267 (May 11-15, 1997).

Hannes Eder, "On Extending PostgreSQL with the Skyline Operator," Jan. 27, 2009, Accessed at https://web.archive.org/web/20111222065210/http://skyline.dbai.tuwien.ac.at/thesis-heder-twoside-web-200901271.pdf archived on Jan. 27, 2009, pp. 1-117(English abstract).

Hunag, J., et al., "Tuning the Cardinality of Skyline," Proceeding inIWHDM Revised Selected Papers of the APWeb: International Workshops on Advanced Web and Network Technologies, and Applications, vol. 4977, pp. 220-231 (Apr. 26-28, 2008).

International Preliminary Report on Patentability for International Application No. PCT/IB2013/053261 dated Dec. 24, 2014, pp. 21.

International Search Report and Written Opinion for International Application No. PCT/IB2013/53261 dated Nov. 1, 2013, pp. 10.

Jiang, B., et al., "Probabilistic Skylines on Uncertain Data: Model and Bounding-Pruning-Refining Methods," Journal of Intelligent Information Systems vol. 38, No. 1, pp. 1-39 (Feb. 2012).

Jin, W., et al., "The Multi-Relational Skyline Operator", IEEE 23rd International Conference on Data Engineering, pp. 1276-1280 (Apr. 15-20, 2007).

Kossmann, D., et al., "Shooting Stars in the Sky: An Online Algorithm for Skyline Queries", In Proceedings of the 28th Very Large Databases Conference, pp. 275-286 (Aug. 20-23, 2002).

Kung, H.T., et al., "On Finding the Maxima of a Set of Vectors," Journal of the Association for Computing Machinery, vol. 22, No. 4, pp. 469-476 (Oct. 1975).

Lian, X., and Lei, C., "Probabilistic Group Nearest Neighbor Queries in Uncertain Databases," IEEE Transactions on Knowledge and Data Engineering, vol. 20, No. 6, pp. 809-824 (Jun. 2008).

Liu, C., et al., "Design and Evaluation of a Resource Selection Framework for Grid Applications," Proceedings of the 11th IEEE International Symposium on High Performance Distributed Computing, pp. 1-8 (Jul. 24-26, 2002).

Mishra, S., "Probabilistic Skyline Queries in Distributed Environments with Low Message Overhead," Department of Computer Science and Engineering, Indian Institute of Technology Kanpur, pp. 68 (Jun. 2013).

Qi, Y., and Atallah, M., "Identifying Interesting Instances for Probabilistic Skylines", Computer Science Technical Reports, pp. 1-15 (Dec. 2009).

Sen, P., et al., "Representing tuple and attribute uncertainty in probabilistic databases," Seventh IEEE International Conference on Data Mining Workshops, pp. 507-512 (Oct. 28-31, 2007).

Soliman, M.A., et al., "URank: Formulation and Efficient Evaluation of Top-k Queries in Uncertain Databases," Proceedings of the 2007 ACM SIGMOD International Conference on Management of data, pp. 1082-1084 (Jun. 11, 2007).

Stonebraker, M., and Helllerstein, J.-M., "Content Integration for E-Business", Proceedings of the 2001 ACM SIGMOD international conference on Management of data, vol. 30, Issue 2, pp. 552-560 (May 21-24, 2001).

Suciu, D., et al., "Probabilistic databases", Synthesis Lectures on Data Management, vol. 3, No. 2, pp. 1-182 (May 2011).

Sun, D., et al., "Skyline—Join in Distributed Databases," 24th International Conference on Data Engineering, pp. 1-8 (Apr. 7-12, 2008).

Tan, K-L., et al., "Efficient Progressive Skyline Computation," Proceedings of the 27th International Conference on Very Large Data Bases, vol. 1, pp. 301-310 (Sep. 11-14, 2001).

Teja, P., "Complex query processing in large databases," Its my view blog, pp. 2 (May 10, 2010).

Teja, P.B., "Improving the Efficiency and Extending the Scope of Skyline Operator," A Thesis Submitted in Partial Fulfillment of the Requirements for the Degree of Master of Technology, Department of Computer Science and Engineering of Indian Institute of Technology Kanpur, May 2010, pp. 75.

Yuan, H., and Atallah, M.J., "Efficient Data Structures for Range-Aggregate Queries on Trees," Proceedings of the 12th International Conference on Database Theory, pp. 111-120 (Mar. 23-25, 2009).

Xiaofeng Ding et al., "Efficient and Progressive Algorithms for Distributed Skyline Queries over Uncertain Data", 2010 IEEE 30th International Conference on ICDCS, Jun. 21-25, 2010, pp. 149-158.

Xiaofeng Ding et al., "Efficient and Progressive Algorithms for Distributed Skyline Queries over Uncertain Data", IEEE Transactions on Kowledge and Data Engineering, Aug. 2012, pp. 1448-1462, vol. 24, No. 8.

Raphael Finkel et al., "Quad Trees: A Data Structure for Retrieval on Composite Keys", ACTA Informatica, Jan. 1974, Retrieved on Jun. 16, 2015, pp. 10, vol. 4, No. 1.

Antonin Guttman, "R-Trees: A Dynamic Index Structure for Spatial Searching", ACM SIGMOD, Jun. 1984, pp. 47-57, vol. 14, No. 2.

(56) References Cited

OTHER PUBLICATIONS

Katja Hose et al., "A Survey of Skyline Processing in Highly Distributed Environments", The International Journal on Very Large Data Bases, Jun. 2012, pp. 359-384, vol. 21, Issue 3.
International Search Report and Written Opinion of the International Searching Authority, International application No. PCT/IB14/59087, dated Jun. 13, 2014.
M. Morse et al., "Efficient Continuous Skyline Computation", Journal of Information Sciences, Sep. 2007, pp. 3411-3437, vol. 117.
Dimitris Papadias et al., "An Optimal and Progressive Algorithm for Skyline Queries", Proceedings of the 2003 ACM SIGMOD international conference on Management of data, 2003, pp. 467-478.
Jian Pei et al., "Probabilistic Skylines on Uncertain Data", Proceedings of the 33rd international conference on Very Large Data Bases, Sep. 23-28, 2007, pp. 15-26.
Joao B. Rocha-Junior et al., "AGiDS: A Grid-Based Strategy for Distributed Skyline Query Processing", Proceeding of second International conference Globe, Sep. 1-2, 2009.
Akrivi Vlachou et al., "SKYPEER: Efficient Subspace Skyline Computation over Distributed Data", IEEE 23rd International Conference on Data Engineering, Apr. 15-20, 2007, pp. 416-425.
Xiaowei Wang et al., "Grid-Based Probabilistic Skyline Retrieval on Distributed Uncertain Data", Proceedings of the 16th international conference on Database systems for advanced applications, Apr. 22, 2011, pp. 538-547.
Zhenjie Zhang et al., "Kernel-Based Skyline Cardinality Estimation", Proceedings of the 2009 ACM SIGMOD International Conference on Management of data, Jun. 20-Jul. 2, 2009, pp. 509-522.
Zhenjie Zhang et al., "Minimizing the Communication Cost for Continuous Skyline Maintenance", Proceedings of the 2009 ACM SIGMOD International Conference on Management of data, Jun. 29-Jul. 2, 2009, pp. 495-508.
Khalefa, M. E. et al., "Prefjoin: An efficient preference-aware join operator," IEEE 27th International Conference on Data Engineering, pp. 995-1006 (2011).
Vlachou, A., et al., "Skyline query processing over joins," In Proceedings of the 2011 ACM SIGMOD International Conference on Management of data, pp. 73-84 (Jun. 12, 2011).

\* cited by examiner

MULTIPLE CRITERIA DECISION ANALYSIS IN DISTRIBUTED DATABASES

CROSS-REFERENCE TO RELATED APPLICATIONS

The present application is the U.S. National Stage filing under 35 U.S.C § 371 of International Application No. PCT/IB2014/059087, filed on Feb. 19, 2014, and entitled "MULTIPLE CRITERIA DECISION ANALYSIS IN DISTRIBUTED DATABASES," International Application No. PCT/IB2014/059087 claims priority under 35 U.S.C. § 119(a) to Indian Patent Application No. 50/DEL/2014, filed on Jan. 7, 2014. Indian Patent Application No. 50/DEL/2014 and the International Application No. PCT/IB2014/059087, including any appendices or attachments thereof, are incorporated by reference herein in their entirety.

BACKGROUND OF THE DISCLOSURE

Multiple criteria decision analysis generally refers to an approach of making numerous and sometimes conflicting evaluations among multiple relations having various uncertainties. Such multiple criteria decision analysis has various applications. One example application is in finding travel deals through an interface from different sources. The interface is configured to access the different sources which have no direct access to each other. Some example sources may include travel search engines (e.g., kayak.com, fly.com, skyscanner.com) and hotel search engines (e.g., trivago.com, room77.com, google.com/hotelfinder). The data at these sources typically are not maintained at one central repository but instead in different databases.

SUMMARY

Some embodiments of the present disclosure may generally relate to methods for selecting a preferred data set among distributed databases including a first database having a first probability attribute and a second database having a second probability attribute. One example method may include receiving a first data set selected from the first database and a second data set selected from the second database. The first data set includes a first monotonic attribute. The second data set includes a second monotonic attribute. The example method may further include selecting a candidate data set from one of the first data set and the second data set based on a comparison of the first monotonic attribute and the second monotonic attribute and determining whether the selected candidate data set is the preferred data set at least partly based on a minimum probability of the selected candidate data set being the preferred data set, a maximum probability of the selected candidate data set being the preferred data set and a threshold probability.

Additional embodiments of the present disclosure may generally relate to computer-readable mediums containing instructions for selecting a preferred data set among distributed databases including a first database having a first probability attribute and a second database having a second probability attribute. One example computer-readable medium may contain instructions, which when executed by a computing device, causes the computing device to receive a first data set selected from the first database and a second data set selected from the second database. The first data set includes a first monotonic attribute. The second data set includes a second monotonic attribute. The example computer-readable medium may further containing additional instructions, which when executed by the computing device, causes the computing device to select a candidate data set from one of the first data set and the second data set based on a comparison of the first monotonic attribute and the second monotonic attribute and determine whether the selected candidate data set is the preferred data set at least partly based on a minimum probability of the selected candidate data set being the preferred data set, a maximum probability of the selected candidate data set being the preferred data set and a threshold probability.

Other embodiments of the present disclosure may generally relate to a computing device configured to select a preferred data set among distributed databases including a first database having a first probability attribute and a second database having a second probability attribute. One example computing device includes a processing unit. The processing unit is configured to receive a first data set selected from the first database and a second data set selected from the second database. The first data set includes a first monotonic attribute. The second data set includes a second monotonic attribute. The processing unit is further configured to select a candidate data set from one of the first data set and the second data set based on a comparison of the first monotonic attribute and the second monotonic attribute and determine whether the selected candidate data set is the preferred data set at least partly based on a minimum probability of the selected candidate data set being the preferred data set, a maximum probability of the selected candidate data set being the preferred data set and a threshold probability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
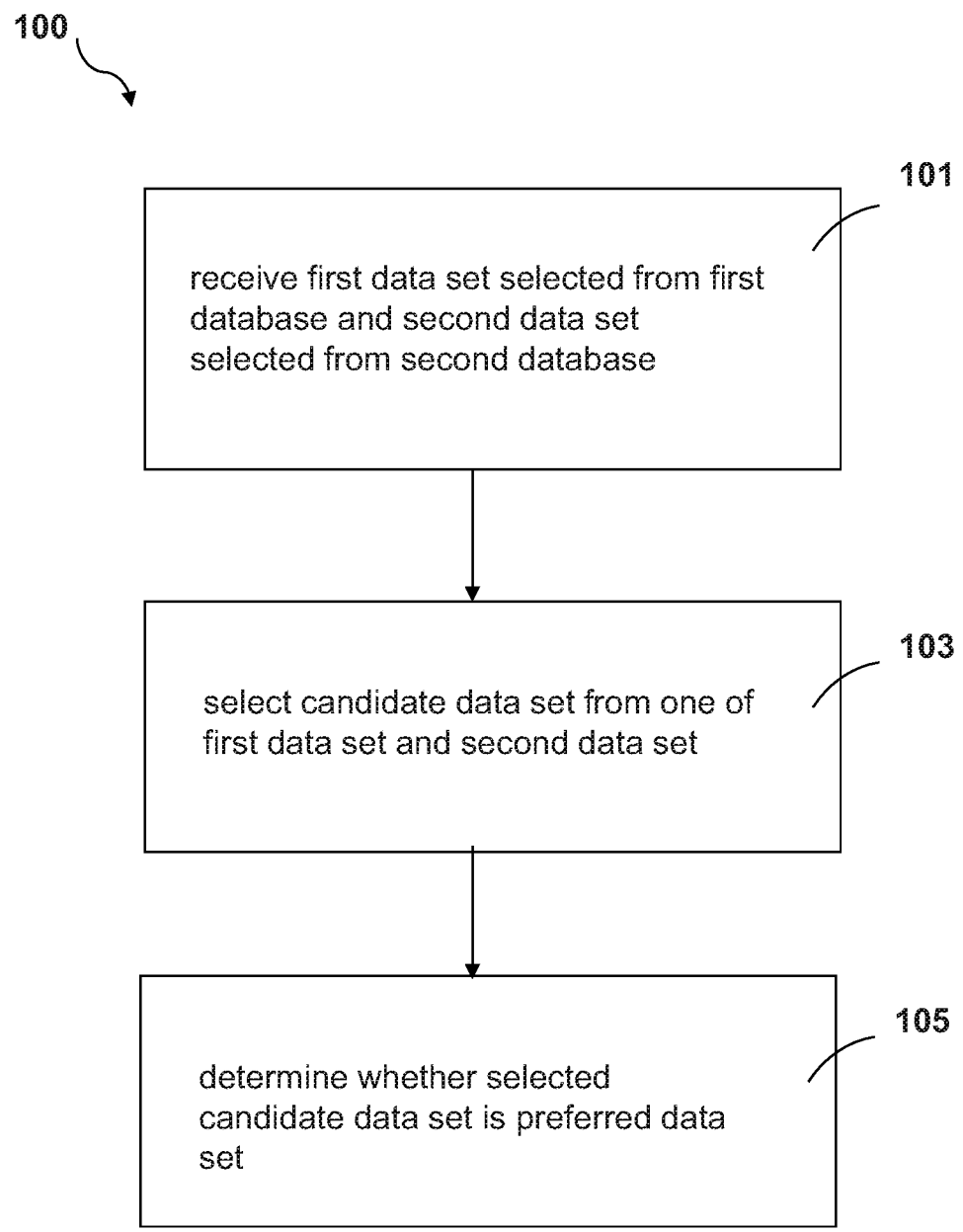
FIG. 1 is a flow chart of an illustrative embodiment of a method for selecting a preferred data set among distributed databases.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of selecting a preferred data set among distributed databases.

In this disclosure, the term "skyline computation" generally refers to an approach to address a problem of multi-criteria decision making where there is no clear preference function over the attributes of different data sets. Instead, such computation attempts to get an overall picture of which objects dominate other objects based on one or more preset preferences. A first tuple "dominates" a second tuple if at least one attribute in the first tuple is preferred over the respective attribute in the second tuple, while the rest of the attributes in the first tuple are considered equal to or more preferred than the respective attributes in the second tuple. The term "skyline probability" generally refers to a probability that an object is part of a data set obtained as a result of a skyline computation. An "existence probability attribute" is an attribute in a relation. The "existence probability" generally refers to a probability associated with a tuple in the relation. It denotes the probability of whether the tuple exists or not.

In some embodiments, the multiple criteria decision analysis may include a skyline computation. A skyline computation has wide applications. For example, one application may involve selecting hotels that are cheap and close to the beach. After the skyline computation, hotels in the computed preferred data set are better than those not in the preferred set because they are superior in at least one attribute, cost or closeness to the beach, while being equivalent or better in all other attributes. Another example may include selecting a combination of a camera and a memory card in which the total price is the lowest, the image resolution of the camera is the highest, and the capacity of the memory card is the highest. The multiple criteria decision analysis may be more complicated when the existence of a tuple in a relation is uncertain and has an existence probability. The existence probability may play a role when a query includes a threshold probability. The probability of the tuple being a skyline may be the existence probability multiplied with the probability that none of other tuples dominate the tuple. In some embodiments, if a tuple has a skyline probability less than the threshold probability, the tuple may not be a part of the skyline. If a tuple has skyline probability greater than or equal to the threshold probability, the tuple may be a part of the skyline.

In some embodiments, a data set may be a relation (or table) in a relational database and the preferred data set may be computed as a result set for a Structured Query Language (SQL) query. In some embodiments, a data set may be a flat file. In some other embodiments, a data set may be a set of tuples in a non-relational database. In yet other embodiments, a data set may be a set of tuples in a semi-structured data store. The example embodiments discussed henceforth are directed towards computing a preferred data set in a relational database system. However, it will be apparent to those of ordinary skill in the art, that the proposed technique may be applied to data sets other than those stored in a relational database system.

FIG. 1 is a flow chart of an illustrative embodiment of a method 100 for selecting a preferred data set among distributed databases, in accordance with some embodiments of the disclosure. In some embodiments, the distributed databases may include a first database and a second database. The data sets stored in the first database and the data sets stored in the second database may not be maintained at a central repository. The first database and the second database may be configured to be accessed by a coordinator which is configured to receive a query. The preferred data set may be selected from the data sets stored in the first database and the second database in response to the query. In some embodiments, the query may be associated with the skyline computation and may include a threshold probability.

In block 101, the coordinator may receive a first data set selected from the first database and a second data set selected from the second database. The first data set may include a first local skyline probability attribute and a first monotonic attribute. The second data set may include a second local skyline probability attribute and a second monotonic attribute. A local skyline probability generally refers to a probability that an object is part of a data set obtained as a result of a skyline computation carried out in a single database. The local skyline probability of a data set may be the existence probability of the data set if the data set is not dominated by other data sets in the same database. The local skyline probability of a data set may be the product of the existence probability of the data set and the non-existence probabilities of data sets in the same database that dominate the data set.

The monotonic attribute may be computed using a monotonic function. Some example monotonic attributes include, but not limited to, Manhattan distance attribute, Euclidean distance attribute, etc. For example, the Manhattan distance of a d-dimensional point $t=<t_1, t_2, \ldots, t_d>$ in a coordinate system having the origin $(0, 0, \ldots, 0)$ is $t_1+t_2+\ldots+t_d$.

In some embodiments, the data sets in the first database and the data sets in the second database may be stored in a technical feasible index structure, for example, the n-Ary tree index structure. An n-Ary tree is an n-dimensional generalization of a Quad tree. Based on the n-Ary tree structure, the first database may be configured to construct a local summary of its own datasets by performing a grid partitioning (uniform or non-uniform) of the entire data space. When the preferred data set is likely to be at a certain regions of the data space, the non-uniform grid partitioning aware of the dense distribution of the preferred data set may provide a summary with a higher precision. Assuming a set of data sets lying in a cell of the grid, the cell is configured to store the probability that none of the set of data sets lying in the cell exist. For empty cells of the grid, each of the empty cells is configured to store a value of 1. The local summaries of the first database and the second database may be transmitted to the coordinator. The coordinator may construct and maintain a global summary based on the local summary of the first database and the local summary of the second database. In some embodiments, the global summary may be updated when any of the local summaries of the databases is changed.

In some embodiments, the data sets in the same database may be arranged in an increasing order of their monotonic attributes from the origin. The first data set may have the minimum monotonic attribute among the data sets in the first database if the data sets have not been examined as the preferred data set. The second data set may have the minimum monotonic attribute among the data sets in the second database if such data sets have not been examined as the preferred data set.

In block 103, the coordinator may select a candidate data set from one of the first data set and the second data set. The selection may be based on a comparison of the first monotonic attribute and the second monotonic attribute. In some embodiments, the candidate data set may have a monotonic attribute less than the monotonic attribute of the other data set.

In block 105, the coordinator may determine whether the selected candidate data set is the preferred data set. In some embodiments, the determination may be at least partly based on a minimum probability of the selected candidate data set being the preferred data set, a maximum probability of the selected candidate data set being the preferred data set and the threshold probability.

In some embodiments, when the maximum probability of the selected candidate data set being the preferred data set is less than the threshold probability, the selected candidate data set may not be the preferred data set. In some embodiments, when the minimum probability of the selected candidate data set being the preferred data set is greater than or equal to the threshold probability, the selected candidate data set may be the preferred data set.

In some embodiments, the preferred data set may be transmitted to the second database, with a feedback probability if the preferred data set is selected from the first database. The transmission of the preferred data set to a node other than the node that the preferred data set resides may decrease total processing time for examining all data sets stored in the first database and the second database for the preferred data set according to the query received by the coordinator. In some embodiments, when (1) the maximum probability of the selected candidate data set being the preferred data set is greater than or equal to the threshold probability, and (2) the minimum probability of the selected candidate data set being the preferred data set is less than the threshold probability, the selected candidate data set may be discarded and determined not to be the preferred data set if a score of the selected candidate is less than a threshold. The selected candidate data set may not be broadcasted between the first database and the second database to reduce the communication cost between the first database and the second database, but at the cost of the completeness of the preferred data set.

In some other embodiments, when (1) the maximum probability of the selected candidate data set being the preferred data set is greater than or equal to the threshold probability and (2) the minimum probability of the selected candidate data set being the preferred data set is less than the threshold probability, the selected candidate data set may be transmitted to the second database if the selected candidate data set is selected from the first database. After receiving the selected candidate data set, the second database may be configured to calculate a domination probability that none of the tuples in the second database that dominate the selected candidate data set exist. For illustration only, if two tuples exist in the second database having their existence probabilities of 0.3 and 0.6, respectively and the two tuples in the first database both dominate the selected candidate data set, the domination probability that none of the tuples in the second database exist that dominate the selected candidate data set will be $(1-0.3)\times(1-0.6)=0.28$.

Following the illustrated example set forth above, the second database may transmit the domination probability of 0.28 back to the coordinator. The coordinator may then be configured to calculate a skyline probability of the selected candidate data set. The skyline probability of the selected candidate data set may be the product of 0.28 and (the probability of the selected candidate data set not dominated by other data sets in the first database). If the skyline probability of the selected candidate data set is less than the threshold probability, the selected candidate data set may not be the preferred data set. If the skyline probability of the selected candidate data set is equal to or greater than the threshold probability, the selected candidate data set may be the preferred data set.

In some embodiments, the coordinator may be configured to receive a third data set selected from the first database. The third data set may correspond to the next data set in the first database arranged according to the increasing order of the monotonic attributes in the first database. In some embodiments, the method 100 may be iterated, where the first data set may be replaced with the third data set.

Figure 2A:
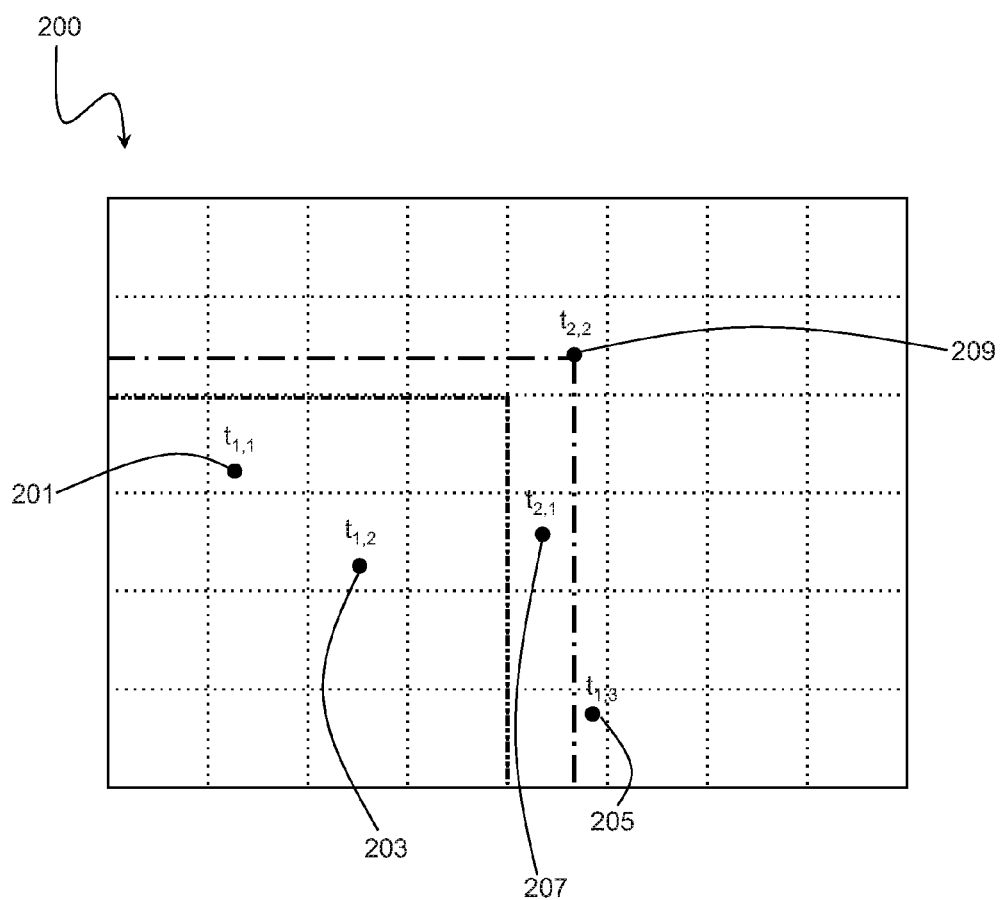
FIG. 2A illustrates a table for determining a maximum probability of a data set being the preferred data set.

FIG. 2A illustrates a table 200 for determining a maximum probability of a data set being the preferred data set, in accordance with some embodiments of the disclosure. For illustration only, five data sets (i.e., $t_{1,1}, t_{1,2}, t_{1,3}, t_{2,1}$ and $t_{2,2}$) are lying in table 200. Three data sets (i.e., $t_{1,1}, t_{1,2}, t_{1,3}$) are stored in the first database and the other two data sets (i.e., $t_{2,1}, t_{2,2}$) are stored in the second database. Any of the data sets includes its own existence probability, for example, the existence probabilities of $t_{1,1}, t_{1,2}, t_{1,3}, t_{2,1}$ and $t_{2,2}$ may be 0.2, 0.2, 0.7, 0.8 and 0.9, respectively. As set forth above, in some embodiments, a cell is configured to store the probability that none of the set of data sets lying in the cell exist. Therefore, cells 201, 203, 205, 207 and 209 may store the values of $(1-0.2), (1-0.2), (1-0.7), (1-0.8)$ and $(1-0.9)$, respectively.

In a uniform grid partitioning (e.g., table 200), a domination region for a data set may correspond to the largest region of space such that any point lying inside the region dominates the data set. In Table 200, the domination region for $t_{2,2}$ may be approximated using the uniform grid partitioning as an orthogonal range space shown as the dotted box in Table 200. In some embodiments, the maximum probability of a data set being the preferred data set is the continued product of value of every cell lying in the orthogonal range space for the data set. For example, for $t_{2,2}$, the maximum probability of $t_{2,2}$ being the preferred data set is $(1-0.2)\times(1-0.2)=0.64$.

Figure 2B:
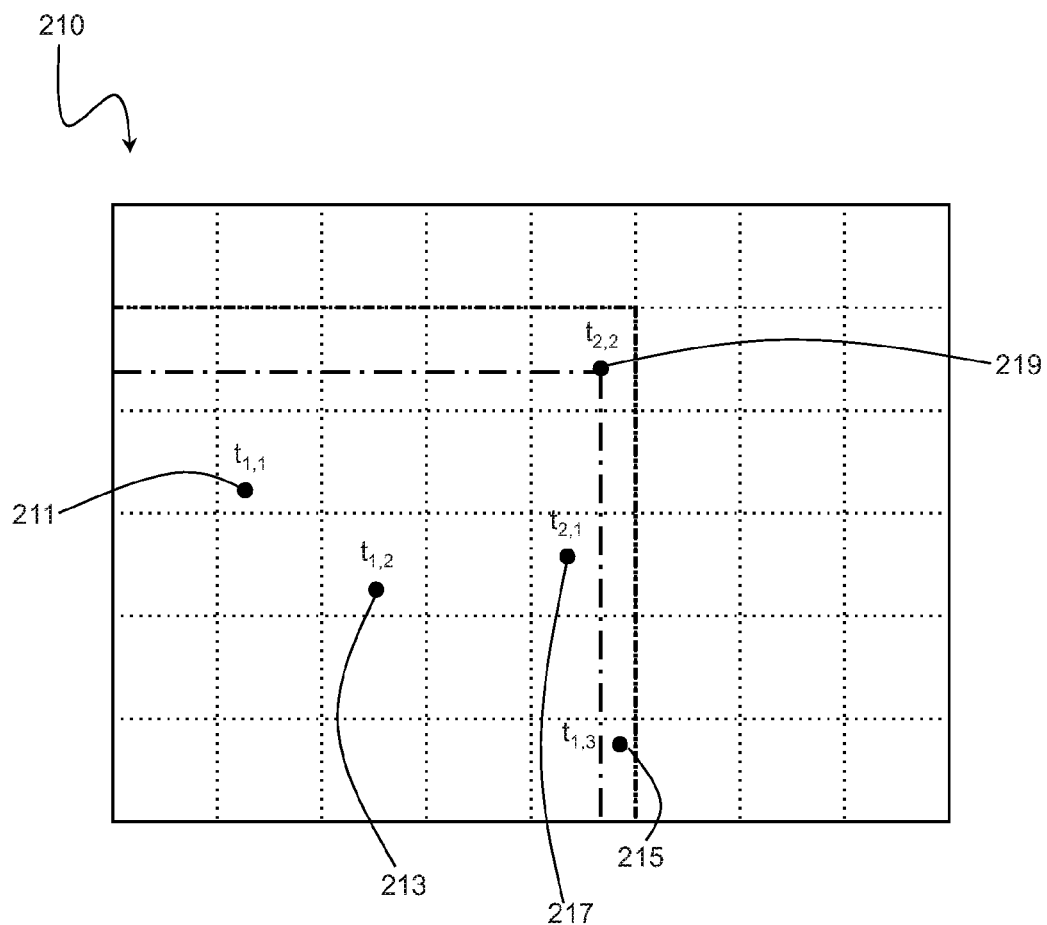
FIG. 2B illustrates a table for determining a minimum probability of a data set being the preferred data set.

FIG. 2B illustrates a table 210 for determining a minimum probability of a data set being the preferred data set, in accordance with some embodiments of the disclosure. For illustration only, five data sets (i.e., $t_{1,1}, t_{1,2}, t_{1,3}, t_{2,1}$ and $t_{2,2}$) are lying in table 210. Three data sets (i.e., $t_{1,1}, t_{1,2}, t_{1,3}$) are stored in the first database and the other two data sets (i.e., $t_{2,1}, t_{2,2}$) are stored in the second database. Any of the data sets may include its own existence probability, for example, the existence probabilities of $t_{1,1}, t_{1,2}, t_{1,3}, t_{2,1}$ and $t_{2,2}$ may be 0.2, 0.2, 0.7, 0.8 and 0.9, respectively. As set forth above, in some embodiments, a cell may be configured to store the probability that none of the set of data sets lying in the cell exist. Therefore, cells 211, 213, 215, 217 and 219 may store the value of $(1-0.2), (1-0.2), (1-0.7), (1-0.8)$ and $(1-0.9)$, respectively.

In a uniform grid partitioning (e.g., table 210), a complement domination region for a data set may correspond to the smallest region of space such that any point lying outside the region cannot dominate the data set. In Table 210, the complement domination region for $t_{2,2}$ may be approximated using the uniform grid partitioning as a complement orthogonal range space as the dashed-double-dot region shown in Table 210. In some embodiments, the minimum probability of a data set being the preferred data set may be the continued product of value of every cell lying in the complement orthogonal range space for the data set. For example, for $t_{2,2}$, the minimum probability of $t_{2,2}$ being the preferred data set is $(1-0.2)\times(1-0.2)\times(1-0.9)=0.064$.

Figure 3:
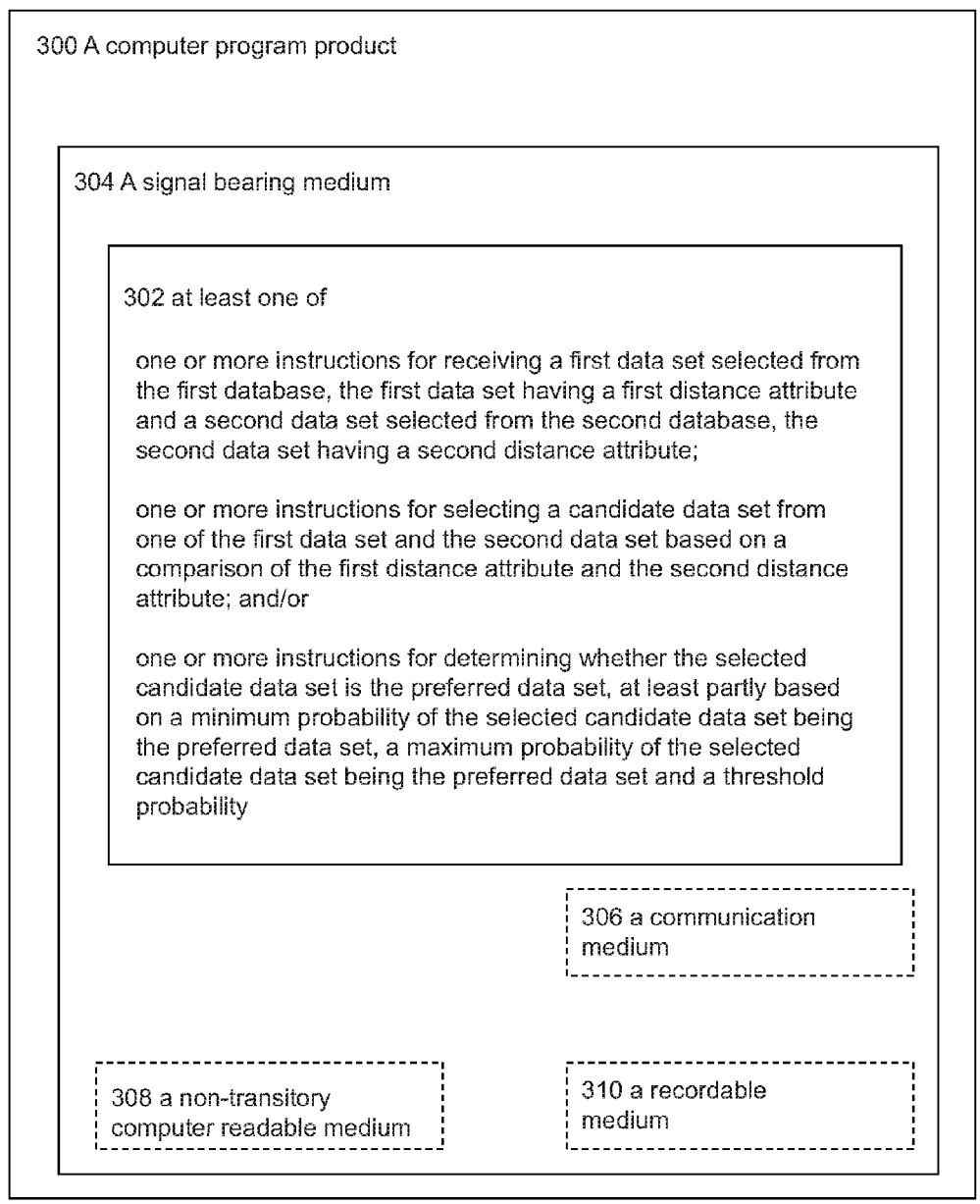
FIG. 3 shows a block diagram of an illustrative embodiment illustrating a computer program product that is arranged for selecting a preferred data set among distributed databases.

FIG. 3 shows a block diagram illustrating a computer program product that is arranged for selecting a preferred data set among distributed databases. The computer program product 300 may include a signal bearing medium 304, which may include one or more sets of executable instructions 302 that, when executed by, for example, a processor of a computing device, may provide at least the functionality described above and illustrated in FIG. 1.

In some implementations, the signal bearing medium 304 may encompass a non-transitory computer readable medium 308, such as, but not limited to, a hard disk drive, a Compact Disc (CD), a Digital Versatile Disk (DVD), a digital tape, memory, etc. In some implementations, the signal bearing medium 304 may encompass a recordable medium 310, such as, but not limited to, memory, read/write (R/W) CDs, R/W DVDs, etc. In some implementations, the signal bearing medium 304 may encompass a communications medium 306, such as, but not limited to, a digital and/or an analog communication medium (e.g., a fiber optic cable, a waveguide, a wired communications link, a wireless communication link, etc.) The computer program product 300 may also be recorded in the non-transitory computer readable medium 308 or another similar recordable medium 310.

Figure 4:
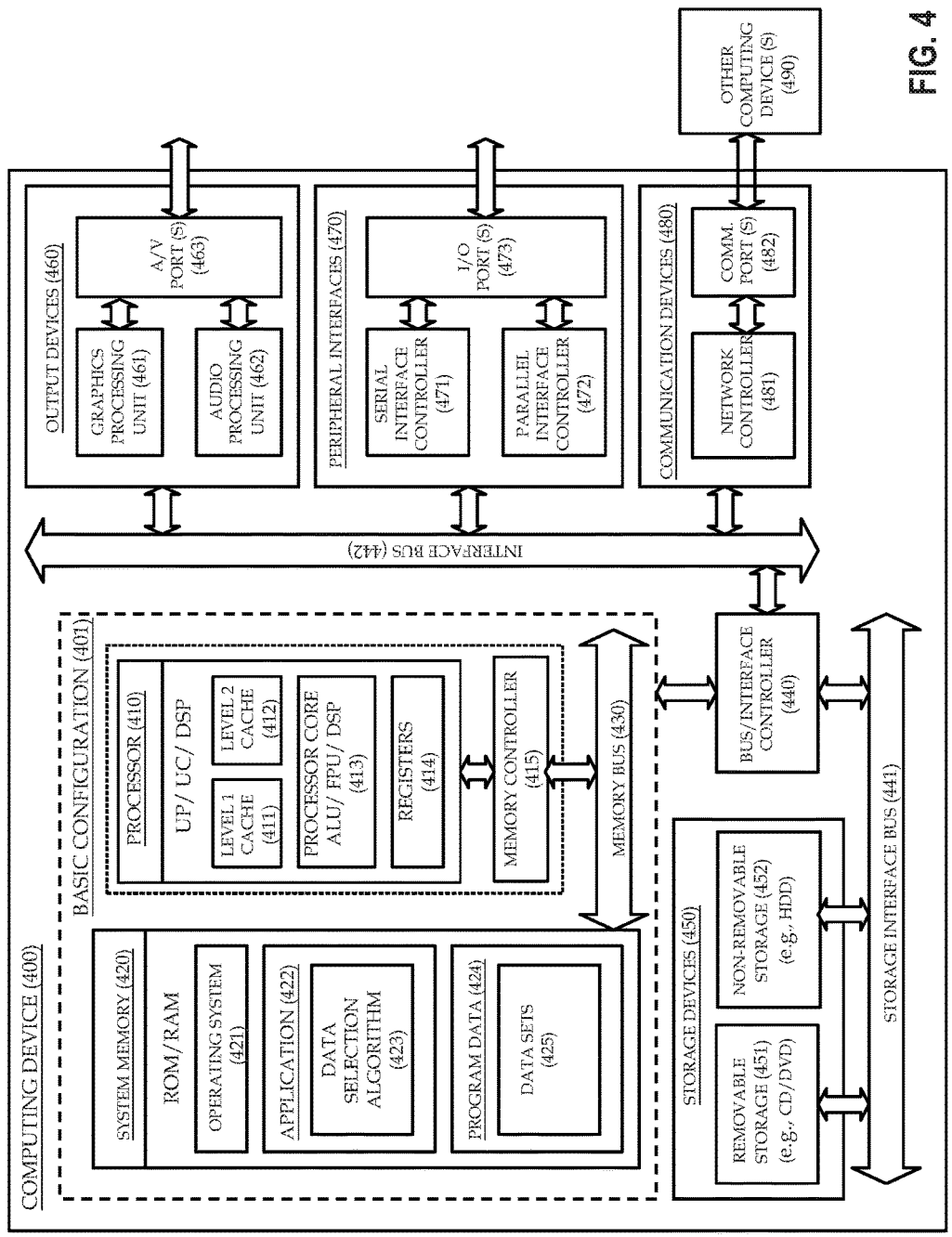
FIG. 4 shows a block diagram of an illustrative embodiment of a computing device that is arranged for selecting a preferred data set among distributed databases, all arranged in accordance with embodiments of the disclosure.

FIG. 4 shows a block diagram of an illustrative embodiment of a computing device that is arranged for selecting a preferred data set among distributed databases. In a very basic configuration 401, computing device 400 typically includes one or more processors 410 and a system memory 420. A memory bus 430 may be used for communicating between processor 410 and system memory 420.

Depending on the desired configuration, processor 410 may be of any type including but not limited to a microprocessor (μP), a microcontroller (μC), a digital signal processor (DSP), or any combination thereof. Processor 410 may include one more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with processor 410, or in some implementations memory controller 415 may be an internal part of processor 410.

Depending on the desired configuration, system memory 420 may be of any type including but not limited to volatile memory (such as RAM), non-volatile memory (such as ROM, flash memory, etc.) or any combination thereof. System memory 420 may include an operating system 421, one or more applications 422, and program data 424. In some embodiments, application 422 may include a data selection algorithm 423 that is arranged to perform the functions as described herein including those described with respect to the steps 101 to 105 of the method 100 of FIG. 1. Program data 424 may include data sets 425 that may be useful for the operation of data selection algorithm 423 as will be further described below. In some embodiments, the data sets 425 may include, without limitation, the first data set and the second data set of block 101 of FIG. 1. In some embodiments, application 422 may be arranged to operate with program data 424 on operating system 421, such that implementations of selecting preferred data set among distributed databases may be provided as described herein. This described basic configuration 401 is illustrated in FIG. 4 by those components within the inner dashed line.

In some other embodiments, application 422 may include data selection algorithm 423 that is arranged to perform the functions as described herein including those described with respect to the steps 101 to 105 of the method 100 of FIG. 1.

Computing device 400 may have additional features or functionality, and additional interfaces to facilitate communications between basic configuration 401 and any required devices and interfaces. For example, a bus/interface controller 440 may be used to facilitate communications between basic configuration 401 and one or more data storage devices 450 via a storage interface bus 441. Data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as CD drives or DVD drives, solid state drives (SSD), and tape drives to name a few.

System memory 420, removable storage devices 451 and non-removable storage devices 452 are examples of computer storage media. Example computer storage media may include volatile and nonvolatile, removable and non-removable media implemented in any method or technology for storage of information, such as computer readable instructions, data structures, program modules, or other data. Any such computer storage media may be used to store the desired information and which may be accessed by computing device 400 and may be part of computing device 400.

Computing device 400 may also include an interface bus 442 for facilitating communication from various interface devices (e.g., output devices 460, peripheral interfaces 470, and communication devices 480) to basic configuration 401 via bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482. In some embodiments, the other computing devices 490 may include other applications, which may be operated based on the results of the application 422.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to select a particular data set from a plurality of distributed databases that include a first database having a first probability attribute and a second database having a second probability attribute, the method comprising:
   receiving, by one or more processors, a first data set selected from the first database, the first data set having a first monotonic attribute, and a second data set selected from the second database, the second data set having a second monotonic attribute;
   selecting, by the one or more processors, a candidate data set from one of the first data set and the second data set, wherein the selection is based on a comparison of the first monotonic attribute and the second monotonic attribute;
   receiving, by the one or more processors, a first local summary of data sets in the first database and a second local summary of data sets in the second database;
   constructing, by the one or more processors, a global summary based on the first local summary and the second local summary; and
   determining, by the one or more processors, whether the selected candidate data set is the particular data set, wherein the determination is at least partly based on a minimum probability of the selected candidate data set being the particular data set determined based on the global summary, a maximum probability of the selected candidate data set being the particular data set determined based on the global summary, and a threshold probability.

2. The method of claim 1, wherein the first data set is not dominated by other data sets in the first database, and wherein the second data set is not dominated by other data sets in the second database.

3. The method of claim 1, wherein the first monotonic attribute is less than other monotonic attributes in the first database, and wherein the second monotonic attribute is less than other monotonic attributes in the second database.

4. The method of claim 1, wherein selecting the candidate data set comprises selecting the first data set as the candidate data set when the first monotonic attribute is less than the second monotonic attribute.

5. The method of claim 1, wherein the global summary is associated with a grid structure comprising multiple cells, and wherein each cell of the multiple cells stores a probability associated with an existence probability attribute of a data set in the first database and the second database.

6. The method of claim 5, wherein the multiple cells of the grid structure are uniform or non-uniform.

7. The method of claim 5, further comprising determining the maximum probability based on respective existence probability attributes of other data sets in the first database or the second database that are within a domination region for the candidate data set in the global summary, and wherein determining whether the selected candidate data set is the particular data set comprises determining that the selected candidate data set is not the particular data set when the maximum probability of the selected candidate data set being the particular data set is less than the threshold probability.

8. The method of claim 5, further comprising determining the minimum probability based on respective existence probability attributes of other data sets in the first database or the second database that are within a complement domination region for the candidate data set in the global summary, and wherein determining whether the selected candidate data set is the particular data set comprises determining that the selected candidate data set is the particular data set when the minimum probability of the selected candidate data set being the particular data set is greater than the threshold probability.

9. The method of claim 1, further comprising probabilistically transmitting, by the one or more processors, the particular data set to the second database when the particular data set is selected from the first database.

10. The method of claim 1, wherein determining whether the selected candidate data set is the particular data set comprises determining that the selected candidate data set is not the particular data set when:
    the maximum probability of the selected candidate data set being the particular data set is greater than the threshold probability, and
    the minimum probability of the selected candidate data set being the particular data set is less than the threshold probability, and
    wherein determining that the selected candidate data set is not the particular data set is partly based on a score associated with the selected candidate data set.

11. The method of claim 1, further comprising broadcasting, by the one or more processors, the selected candidate data set when the maximum probability of the selected candidate data set being the particular data set is greater than the threshold probability, and the minimum probability of the selected candidate data set being the particular data set is less than the threshold probability.

12. The method of claim 11, further comprising receiving, by the one or more processors, a domination probability associated with the selected candidate data set being a dominator of data sets in the first database.

13. The method of claim 12, further comprising computing, by the one or more processors, a skyline probability of the selected candidate data set being the particular data set at least partly based on the domination probability.

14. The method of claim 1, further comprising receiving, by the one or more processors, after determining whether the selected candidate data set is the particular data set, an additional data set from the first database or the second database.

15. A non-transitory computer-readable storage medium encoded with computer-executable instructions to select a particular data set from a plurality of distributed databases that include a first database having a first probability attribute and a second database having a second probability attribute, wherein the instructions in response to execution by a computing device, cause the computing device to:
identify, by one or more processors, a first data set selected from the first database, the first data set having a first monotonic attribute, and a second data set selected from the second database, the second data set having a second monotonic attribute;
select, by the one or more processors, a candidate data set from one of the first data set and the second data set, wherein the selection is based on a comparison of the first monotonic attribute and the second monotonic attribute;
receive, by the one or more processors, a first local summary of data sets in the first database and a second local summary of data sets in the second database;
construct, by the one or more processors, a global summary based on the first local summary and the second local summary; and
determine, by the one or more processors, whether the selected candidate data set is the particular data set, wherein the determination is at least partly based on a minimum probability of the selected candidate data set being the particular data set determined based on the global summary, a maximum probability of the selected candidate data set being the particular data set determined based on the global summary, and a threshold probability.

16. The non-transitory computer-readable storage medium of claim 15, wherein the first data set is not dominated by other data sets in the first database, and wherein the second data set is not dominated by other data sets in the second database.

17. The non-transitory computer-readable storage medium of claim 15, wherein the first monotonic attribute is less than other monotonic attributes in the first database, and wherein the second monotonic attribute is less than other monotonic attributes in the second database.

18. The non-transitory computer-readable storage medium of claim 15, wherein the selection of the candidate data set comprises a selection of the first data set as the candidate data set when the first monotonic attribute is less than the second monotonic attribute.

19. The non-transitory computer-readable storage medium of claim 15, wherein the global summary is associated with a grid structure comprising multiple cells, and wherein each cell of the multiple cells stores a probability associated with an existence probability attribute of a data set in the first database or the second database.

20. The non-transitory computer-readable storage medium of claim 19, wherein the multiple cells of the grid structure are uniform or non-uniform.

21. The non-transitory computer-readable storage medium of claim 19, with further computer-executable instructions stored thereon that, in response to execution by the computing device, cause the computing device to determine the maximum probability based on respective existence probability attributes of other data sets in the first database or the second database that are within a domination region for the candidate data set in the global summary, and wherein the determination of whether the selected candidate data set is the particular data set comprises a determination that the selected candidate data set is not the particular data set when the maximum probability of the selected candidate data set being the particular data set is less than the threshold probability.

22. The non-transitory computer-readable storage medium of claim 19, with further computer-executable instructions stored thereon that, in response to execution by the computing device, cause the computing device to determine the minimum probability based on respective existence probability attributes of other data sets in the first database or the second database that are within a complement domination region for the candidate data set in the global summary, and wherein the determination of whether the selected candidate data set is the particular data set comprises a determination that the selected candidate data set is the particular data set when the minimum probability of the selected candidate data set being the particular data set is greater than the threshold probability.

23. The non-transitory computer-readable storage medium of claim 15, wherein the instructions include additional instructions, which in response to execution by the computing device, cause the computing device to:
probabilistically transmit the particular data set to the second database when the particular data set is selected from the first database.

24. The non-transitory computer-readable storage medium of claim 15, wherein the determination of whether the selected candidate data set is the particular data set comprises a determination that the selected candidate data set is not the particular data set, when:
the maximum probability of the selected candidate data set being the particular data set is greater than the threshold probability, and
the minimum probability of the selected candidate data set being the particular data set is less than the threshold probability,
wherein the determination that the selected candidate data set is not the particular data set is partly based on a score associated with the selected candidate data set.

25. The non-transitory computer-readable storage medium of claim 15, wherein the instructions include additional instructions, which in response to execution by the computing device, cause the computing device to:
broadcast the selected candidate data set when the maximum probability of the selected candidate data set being the particular data set is greater than the threshold probability, and the minimum probability of the selected candidate data set being the particular data set is less than the threshold probability.

26. The non-transitory computer-readable storage medium of claim 25, wherein the instructions include additional instructions, which in response to execution by the computing device, the computing device to:
identify a domination probability associated with the selected candidate data set being a dominator of data sets in the first database.

27. The non-transitory computer-readable storage medium of claim 26, wherein the instructions include additional instructions, which in response to execution by the computing device, cause the computing device to:
compute a skyline probability of the selected candidate data set being the particular data set at least partly based on the domination probability.

28. The non-transitory computer-readable storage medium of claim 15, wherein the instructions include additional instructions, which in response to execution by the computing device, cause the computing device to:
identify, after the determination of whether the selected candidate data set is the particular data set, an additional data set from the first database or the second database.

29. A computing device configured to select a particular data set from a plurality of distributed databases that include a first database having a first probability attribute and a second database having a second probability attribute, the computing device comprising:
a processing unit, wherein the processing unit is configured to:
receive, by one or more processors, a first data set selected from the first database, the first data set having a first monotonic attribute, and a second data set selected from the second database, the second data set having a second monotonic attribute;
select, by the one or more processors, a candidate data set from one of the first data set and the second data set, wherein the selection of the candidate data set is based on a comparison of the first monotonic attribute and the second monotonic attribute, and wherein the selection of the candidate data set comprises:
a selection of the first data set as the candidate data set when the first monotonic attribute is less than the second monotonic attribute; and
a selection of the second data set as the candidate data set when the second monotonic attribute is less than the first monotonic attribute;
receive, by the one or more processors, a first local summary of data sets in the first database and a second local summary of data sets in the second database;
construct, by the one or more processors, a global summary based on the first local summary and the second local summary; and
determine, by the one or more processors, whether the selected candidate data set is the particular data set, wherein the determination is at least partly based on a minimum probability of the selected candidate data set being the particular data set determined based on the global summary, a maximum probability of the selected candidate data set being the particular data set determined based on the global summary, and a threshold probability.

30. The computing device of claim 29, wherein the first data set is not dominated by other data sets in the first database, and wherein the second data set is not dominated by other data sets in the second database.

31. The computing device of claim 29, wherein the first monotonic attribute is less than other monotonic attributes in the first database, and wherein the second monotonic attribute is less than other monotonic attributes in the second database.

32. The computing device of claim 29, wherein the global summary is associated with a grid structure comprising multiple cells, and wherein each cell of the multiple cells stores a probability associated with an existence probability attribute of a data set in the first database or the second database.

33. The computing device of claim 32, wherein the multiple cells of the grid structure are uniform or non-uniform.

34. The computing device of claim 29, wherein the processing unit is further configured to determine the maximum probability based on respective existence probability attributes of other data sets in the first database or the second database that are within a domination region for the candidate data set in the global summary, and wherein the determination of whether the selected candidate data set is the particular data set comprises a determination that the selected candidate data set is not the particular data set when the maximum probability of the selected candidate data set being the particular data set is less than the threshold probability.

35. The computing device of claim 29, wherein the processing unit is further configured to determine the minimum probability based on respective existence probability attributes of other data sets in the first database or the second database that are within a complement domination region for the candidate data set in the global summary, and wherein the determination of whether the selected candidate data set is the particular data set comprises a determination that the selected candidate data set is the particular data set when the minimum probability of the selected candidate data set being the particular data set is greater than the threshold probability.

36. The computing device of claim 29, wherein the processing unit is further configured to probabilistically transmit the particular data set to the second database when the particular data set is selected from the first database.

37. The computing device of claim 29, wherein the determination of whether the selected candidate data set is the particular data set comprises a determination that the selected candidate data set is not the particular data set, when:
the maximum probability of the selected candidate data set being the particular data set is greater than the threshold probability, and
the minimum probability of the selected candidate data set being the particular data set is less than the threshold probability,
wherein the determination that the selected candidate data set is not the particular data set is partly based on a score associated with the selected candidate data set.

38. The computing device of claim 29, wherein the processing unit is further configured to broadcast the selected candidate data set when the maximum probability of the selected candidate data set being the particular data set is greater than the threshold probability, and the minimum probability of the selected candidate data set being the particular data set is less than the threshold probability.

39. The computing device of claim 38, wherein the processing unit is further configured to receive a domination probability associated with the selected candidate data set being a dominator of data sets in the first database.

40. The computing device of claim 39, wherein the processing unit is further configured to compute a skyline probability of the selected candidate data set being the particular data set at least partly based on the domination probability.

41. The computing device of claim 29, wherein the processing unit is further configured to receive, after the determination of whether the selected candidate data set is the particular data set, an additional data set from the first database and the second database.

* * * * *